April 22, 1924.
V. O. JONES
HEATER
Filed Dec. 24, 1921    6 Sheets-Sheet 6
1,491,268
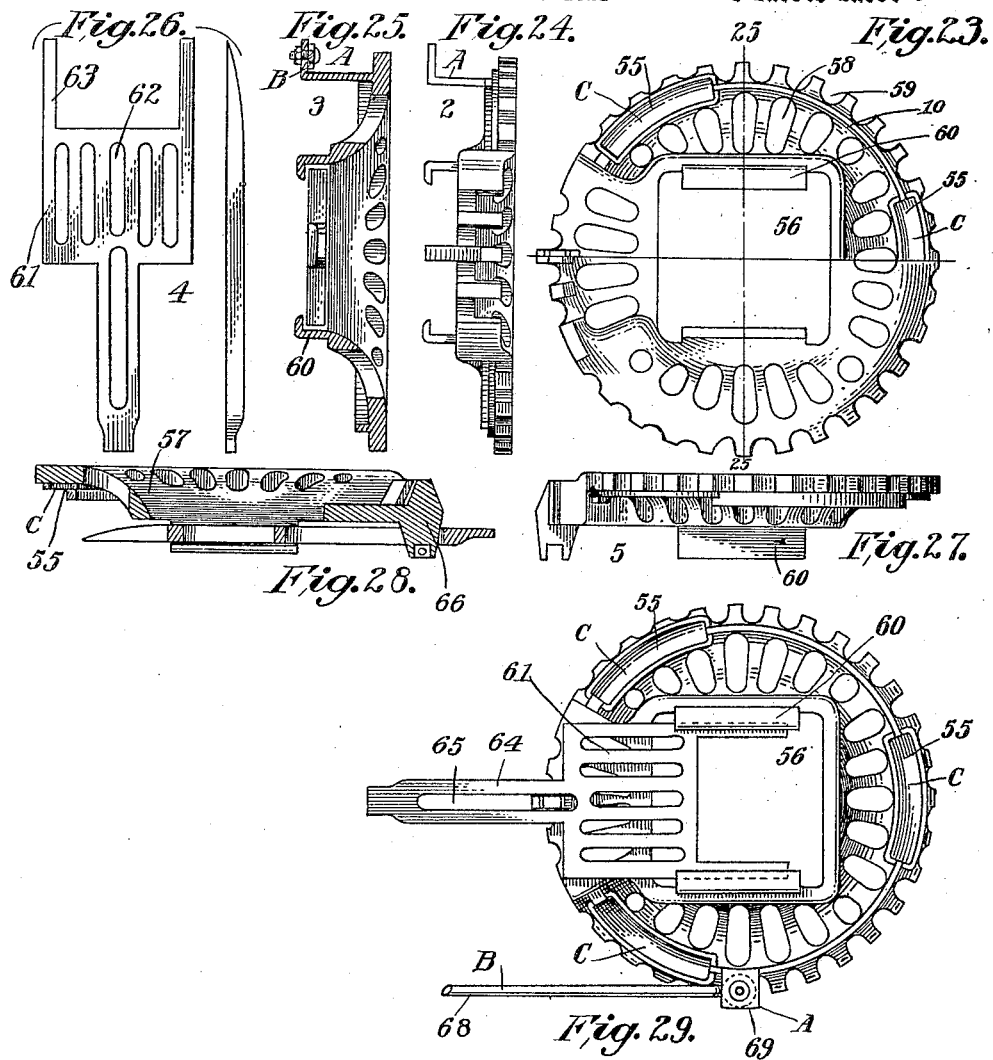

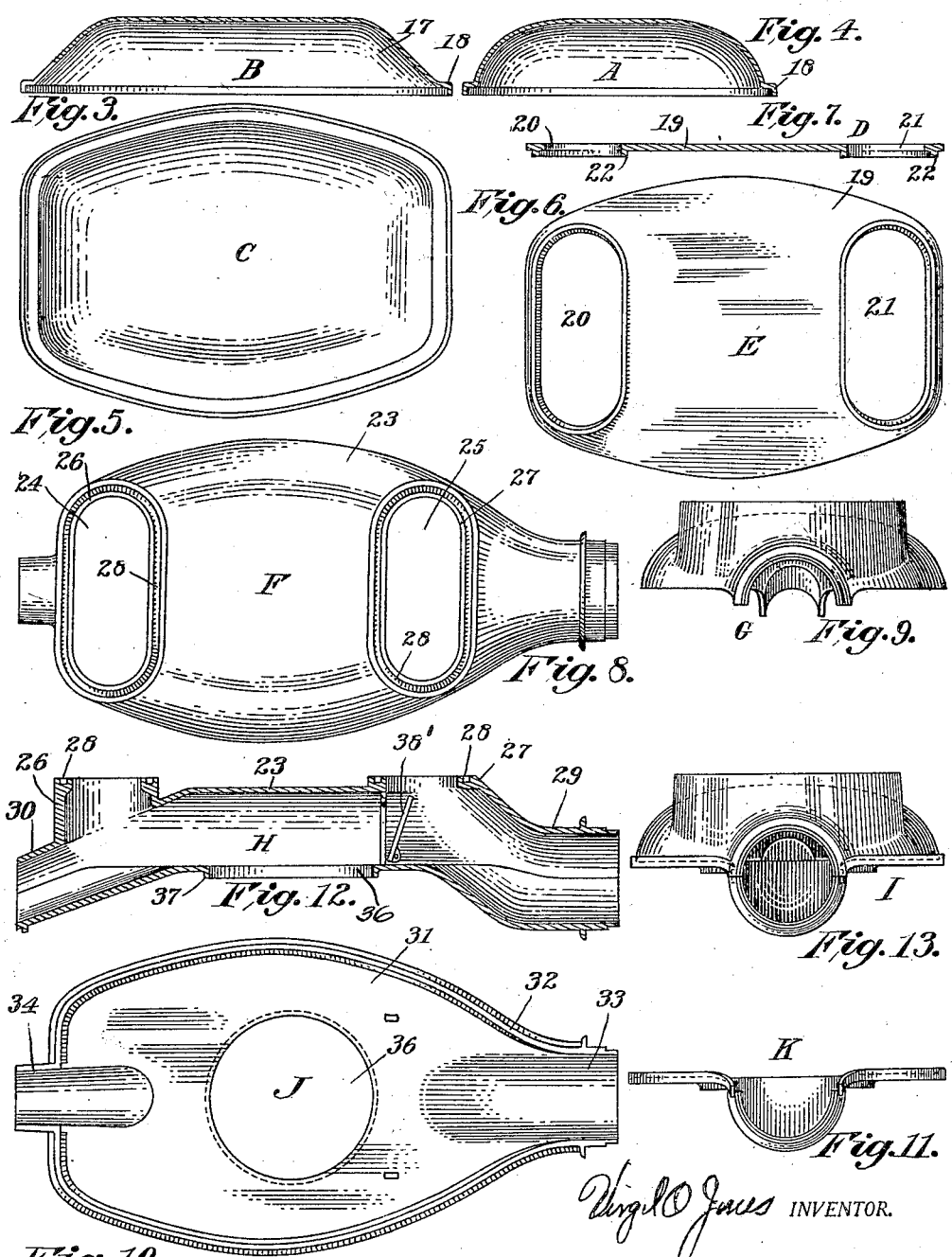

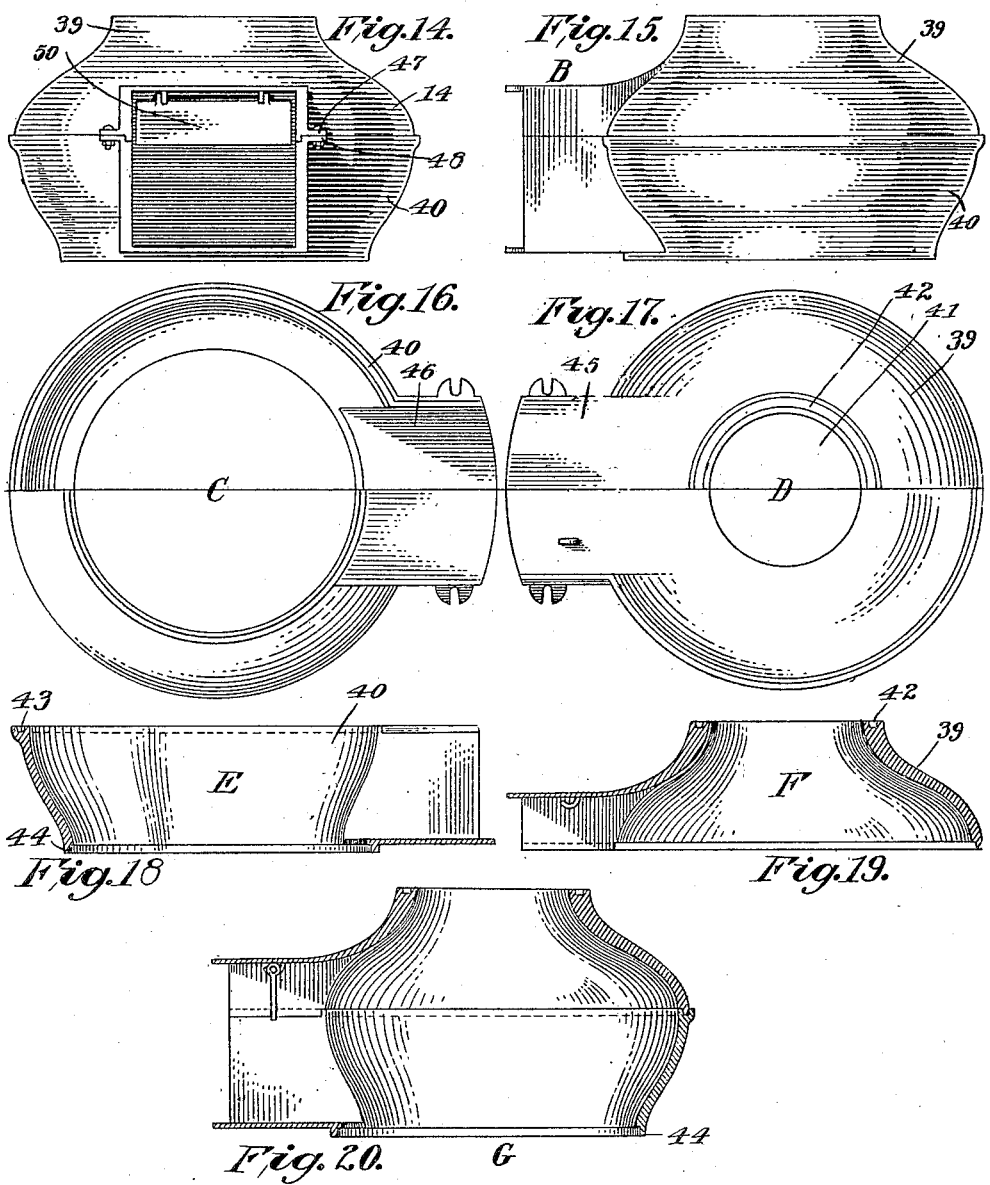

Patented Apr. 22, 1924.

1,491,268

UNITED STATES PATENT OFFICE.

VIRGIL O. JONES, OF DECATUR, ILLINOIS, ASSIGNOR, BY DIRECT AND MESNE ASSIGNMENTS, TO WONDER FURNACE COMPANY, A CORPORATION OF ILLINOIS.

HEATER.

Application filed December 24, 1921. Serial No. 524,732.

*To all whom it may concern:*

Be it known that I, VIRGIL O. JONES, a citizen of the United States, residing at Decatur, in the county of Macon and State of Illinois, have invented a new and useful Improvement in Heaters, of which the following is a specification.

My invention relates to improvements in heaters and more particularly to systems of this character which utilize heated air as the heating medium.

The invention is directed primarily to that type of heater which causes a continuous circulation of air throughout the building, discharging heated air into the building and withdrawing the cooler or cold air therefrom and passing the same through the heater.

An object of this invention is the provision of a heater of this type which is very efficient and economical, consuming a maximum amount of fuel and reducing smoke to a minimum, and utilizing the heat of the gases and products of combustion to a maximum extent. To accomplish this purpose the heater is provided with a special form of double radiator or heating drum, the same being arranged so as to subject the air, the hot gases and products of combustion to the influence of the fire as long as possible and then to retard the passage of the same through the double radiator or heating drum until the maximum amount of heat is extracted therefrom and taken up by the air surrounding the radiator or heating drum.

Further objects of this invention include improvements in details of construction and arrangement whereby an effective heater of this type is provided, which will give maximum efficiency with a minimum fuel consumption, in which the parts are securely mounted and assembled to prevent breakage and leakage of smoke or obnoxious gases.

This invention is directed to the accomplishment of these and other objects which will be apparent from the drawings and reading of the following description. The drawings disclose a preferred embodiment of my invention, but it is expressly understood that various changes may be made in practice and still come within the purview of my invention as defined by the claims.

In the drawings—

Figs. 3 and 4 are longitudinal and transverse cross-sections, respectively, of the upper radiator section of the heating drum.

Fig. 5 is a bottom plan view of the same.

Fig. 6 is a plan view of a dividing plate or partition for the radiator section of the heating drum.

Fig. 7 is a longitudinal cross-section of the same.

Fig. 8 is a top plan view of the top part of the lower radiator section of the heating drum.

Fig. 9 is an end elevation of the view shown in Fig. 8 taken from the right-hand end.

Fig. 10 is a top plan view of the lower radiator section of the heating drum.

Fig. 11 is an end elevation of Fig. 10 taken from the right-hand end thereof.

Fig. 12 is a view in longitudinal cross-section of the lower section the heating drum assembled.

Fig. 13 is an end elevation of Fig. 12 taken from the right-hand end thereof.

Fig. 14 is a front elevation of the combustion chamber.

Fig. 15 is a side elevation thereof.

Fig. 16 is a composite view of the lower half of the combustion chamber the upper part being a top plan view of the same and the lower part being a bottom plan view of the same.

Fig. 17 is a composite view of the upper half of the combustion chamber the upper part of this figure showing a top plan view and the lower part of the figure showing a bottom plan view.

Fig. 18 is a longitudinal cross-section view of the lower half of the combustion chamber.

Fig. 19 is a longitudinal cross-section view of the upper half of the combustion chamber.

Fig. 20 is a longitudinal cross-section view of the combustion chamber assembled.

Fig. 23 is a composite view of the grate, the upper part of said figure showing a bottom plan and the lower part of the figure showing a top plan.

Fig. 24 is a front elevation of the grate, the slide dump being omitted.

Fig. 25 is a transverse cross-section on line 25—25 of Fig. 23, showing the slide dump in position.

Fig. 26 is a plan and side elevation of the slide dump itself.

Fig. 27 is a side elevation of the grate without the slide dump.

Fig. 28 is a cross-sectional view of the grate and slide dump assembled, taken substantially on the dividing line shown in Fig. 23.

Fig. 29 is a bottom plan view of the grate and slide dump assembled, the latter being shown in open position to permit the removal of cinders.

Figure 1:
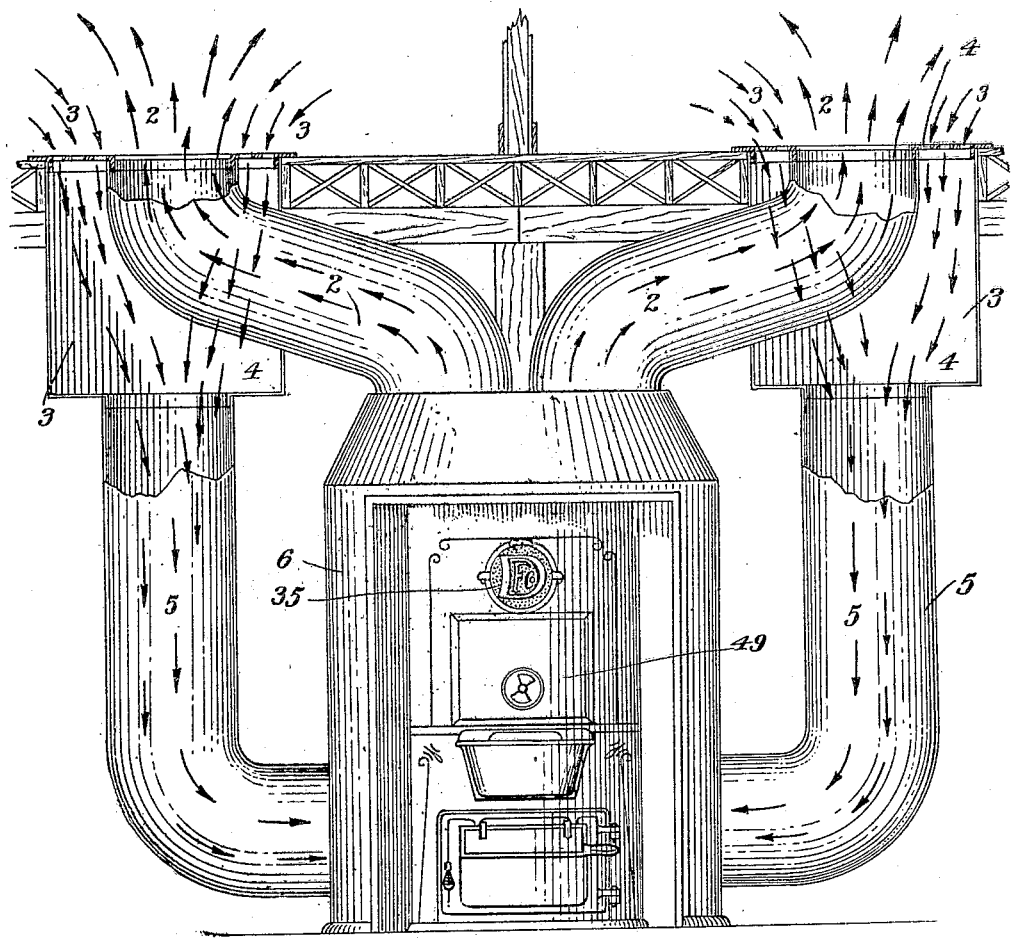
Fig. 1 is an elevation of the heater embodying the invention.

Referring first to Fig. 1, the numeral 1 designates the furnace as a whole from which the hot air pipes 2 extend. These hot air pipes pass through the boxes 3 having the registers or openings 4. The openings from these boxes, which are located in the floor of the building, are greater in area than the openings from the hot air pipes 2. 5 designates the return or cold air pipes which are connected to the boxes 3 and lead to the bottom of the furnace or heating casing, as is well understood. In Fig. 1 the arrows indicate the course of the heated air, the return or cold air, the operation of the system being obvious. It is important, however, to understand that the hot air outlet and the cold air intake unit or box 3 is not located above the furnace, but may be located at a distance therefrom; in fact, a number of separate units may be utilized depending merely upon the convenience of the connection to the furnace so that different rooms may be provided with separate units. This reduces the chance of overheating a single unit located immediately above the heater and also permits the parts to be located where desired or where advisable to prevent the necessity of cutting joists, girders, etc. in the building.

Figure 2:
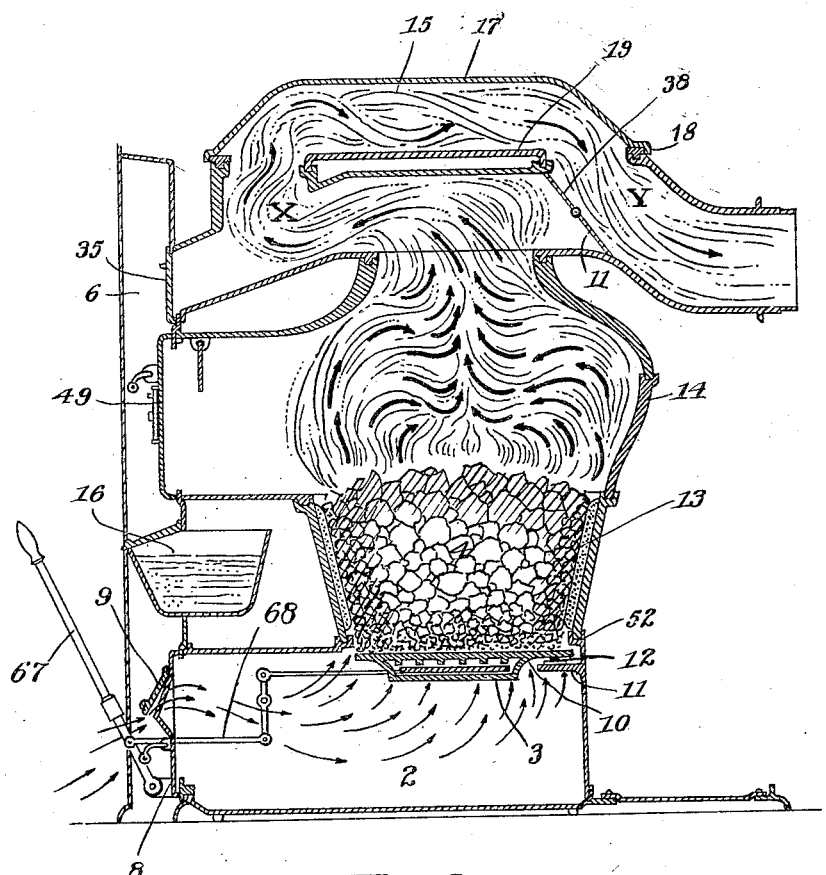
Fig. 2 is a vertical cross-section through the furnace or heater itself.

In this system the heater itself is of new and novel construction and is disclosed as a whole in Fig. 2, and parts thereof are shown in detail in the various other figures of the drawing.

This furnace 1 is provided with the usual outer casing 6 which is spaced from the castings forming parts of the combustion construction thereof. This casing 6 may be suitably insulated by means of an inner corrugated casing or other suitable means. Referring now to Fig. 2, the reference character 7 designates the ash pit which is provided with the usual door 8 and a draft door 9. 10 designates the grate as a whole, which is suitably supported for oscillation by means of the bracket members 11 which support roller members 12 on which the grate rests and may be turned only one of each of these members being shown. Fire pot 13 is properly supported above the grate, and the combustion chamber 14 is supported on said fire pot. Above the combustion chamber is mounted the double radiator or heating drum 15, which has usual connection with a flue or chimney, as is well understood. A suitable water pan 16 is provided adjacent the fire pot. Of course, various supporting means are necessary to hold these parts in assembled relation, but these are not referred to in detail as it is not believed necessary to a complete understanding of my invention.

The double radiator or heating drum will first be described in detail and reference is, therefore, made to the upper part of Fig. 2 in connection with Figs. 3 to 13 inclusive. This double radiator or heating drum 15 rests upon the top of the combustion chamber and provides means whereby the heated gases and products of combustion are circulated through two radiators and provided with two downwardly directed flues for retarding the passage of these products of combustion and hot gases through this part of the heater, which at its discharge end is connected to the flue or chimney.

The component parts of this double radiator or heating drum 15 include an upper radiator section 17 which is of general convex shape and provided with the lip or flange 18 around its lower edge. This lip or flange is adapted to rest over the edge of the dividing or partition plate 19 which, of course, is shaped to correspond to the shape of the part or section 17, and is provided with an opening 20 near its left-hand end and an opening 21 near its right-hand end, these openings being surrounded by the flanges 22, as clearly shown in Figs. 6 and 7. This plate 19 actually forms the bottom of the upper radiator section and rests upon the upper part or half 23 of the lower radiator. The general shape of this casting is clearly shown in Figs. 8, 9 and 12. In plan view it looks somewhat like a bottle, provided, however, with an opening 24 near one end which corresponds to the opening 20 in member 19 and an opening 25 near the other end, which corresponds to the opening 21, the corresponding openings being adapted to register. The member 23 is provided with the upwardly extending flange members 26 and 27 defining said openings 24 and 25, and provided with grooves 28 to receive the flanges 22 on the member 19 as clearly shown in Fig. 2.

This member 23 is provided with the reduced end part 29 at one end, which accounts for its bottle like shape and has another reduced extension 30 at its other end, these parts being half round and cooperating with corresponding parts on the lower radiator section or half 31 of the heating drum. This is shown particularly in Figs. 10 and 11, and corresponds in outline to the said member 23, its edge being provided with the upwardly extending flange 32. This member 31 has the reduced end portion 33 which corresponds to the reduced end portion 29 of the upper part thereof to form the discharge opening from the heating drum to the flue or chimney. At its other end it is provided with the reduced extension 34 corresponding to the extension 30 on the upper part thereof to provide a clean-out opening. This opening is provided with a usual door 35, shown in Figs. 1 and 2. The edge of the lower radiator section is adapted to rest within the flange 32 as clearly shown in Fig. 13. This lower radiator section of the heating drum is provided with the centrally located opening 36 which has the annular flange 37 depending therefrom and resting upon the combustion chamber 14, as shown in Fig. 2 and as will be presently described in detail.

It is to be noted that the lower radiator section of the heating drum is provided with a suitable damper 38. One form is shown in Fig. 2 and a slightly different form 38′ is shown in Fig. 12 of the drawing. This is merely a direct draft damper which is opened when starting the fire, as is well understood.

It is to be noted that this double radiator or heating drum construction receives the hot gases and products of combustion from the combustion chamber, and by means of the down draft X retards their passage through the radiator or heating drum, resulting in backing up the unburned gases and products of combustion in the combustion chamber and causing further consumption of the same, at the same time causing greater absorption of the heat by the radiator itself and consequently greater heating of the air on the outside thereof and within the furnace casing. The same function is materially aided by the additional down draft Y which further retards the passage of the hot gases and products of combustion with the same advantageous results.

The remaining unburned gases together with the unused heated oxygen passing from the combustion chamber into the lower radiator section are again united and combustion begins to again take place as it passes from the lower radiator section to the upper radiator section which is directly over and above the lower radiator section for the reason that gases must remain heated to the same temperature if they are to be consumed or burned.

To hold these gases to the same temperature it is necessary to heat the upper radiator section and that is the reason why it is placed directly over the lower radiator section.

As the lower radiator section sits directly on top of the combustion chamber and the opening from the combustion chamber to the heating drum is directly above and over the fire the blaze enters into and comes in contact with the upper part of the lower radiator section heating it to a high degree and causes the lower radiator section to super-heat the upper radiator section holding temperature in upper half the same as in the combustion chamber and lower half of radiator causing the gases to be burned.

The extra heavy down draft at the chimney end of the upper half of radiator is for the purpose of retarding the flow of gases and heat units until the gases are burned and the heat units absorbed by and pass through the castings into the air chamber where the air is heated and passed up into the home.

In this invention or improvement in warm air heating twice as much heat is thrown out from a pound of fuel than any previous invention for warm air heating.

Of course, this results in very great efficiency in the consumption of the fuel and the utilization of the heat thereof to raise the temperature of the air which passes into the house or dwelling. An other important feature of this construction is that the double radiator or heating drum is mounted on top of the combustion chamber in such a way as to be balanced and the mounting is so simple that it may be turned in any position relative thereto most convenient for installation—that is, to conform with the flue or chimney construction where the furnace is installed.

The combustion chamber is generally designated by the reference character 14 and is shown in Fig. 2 and in detail in Figs. 14 to 20 inclusive. It is made in two parts, 39 designating the upper part and 40 the lower part. The upper part is of general circular shape in horizontal cross-section and decreasing in width from the bottom thereof to the top, the top opening 41 corresponding to the opening 36 in the lower radiator or heating drum and the top part of the combustion chamber is provided with the flanged groove 42 to receive the depending flange 37. It is by this means that the radiator or heating drum is mounted upon the combustion chamber.

The lower part of the combustion chamber 40 is likewise of general circular shape in horizontal cross-section and is widest at its top, being provided there with the groove 43 to receive the bottom edge of the upper section of the combustion chamber. As stated, this lower part or half of the combustion chamber tapers downwardly and is provided at its bottom with the depending flange 44. Each part of the combustion chamber is provided with the cooperating lateral extensions 45 and 46 which are secured together by bolts 47 passing through flanges 48 and from the entrance or chute to the combustion chamber whereby fuel is supplied to the fire. Of course, the opening is closed by the usual door 49. In addition thereto a smoke shield 50 is pivotally mounted in the upper part of this entrance or chute.

It is to be noted, therefore, that this combustion chamber is of convex or bulging type, the sides thereof tapering toward the top and bottom away from the center which is of the greatest diameter. The purpose of this is to cause the air and gases passing from the fire pot through the combustion chamber to follow the walls thereof spreading the same out and over and above the gases when turning the same back over the fire as indicated by arrows in Fig. 2, which has a tendency to retard the passage of the unburned gases and products of combustion through the furnace and subject them to the action of the fire for a greater length of time and causing greater consumption thereof, and consequently better efficiency. This will also have a tendency to throw any heavy matter, such as ashes and unconsumed carbon and the like, over the center of the fire and cause the same to drop thereon again resulting in greater efficiency in fuel consumption and materially assisting in keeping the radiators clean and clear of soot and other dirt. Owing to the air or oxygen passing up along the walls of the combustion chamber over and above the gases the unused oxygen passes into the radiator where it intermingles with the gases as specified in the radiator specification. It is understood that the oxygen by passing along the walls of the combustion chamber is heated to the combustionable temperature when united with the gases.

Figure 21:
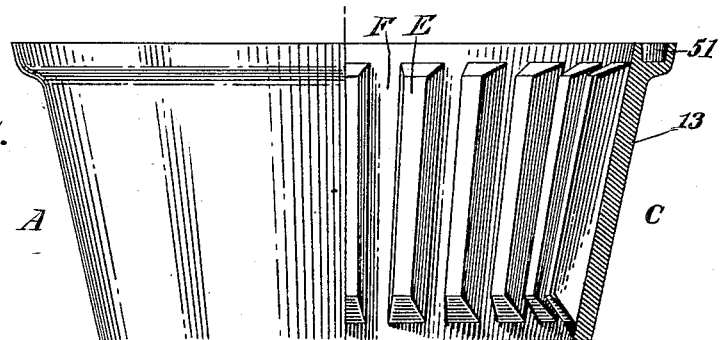
Fig. 21 is a composite view of the fire pot, the left-hand portion being in side elevation and the right-hand portion being in section disclosing an elevation of the interior.
Figure 22:
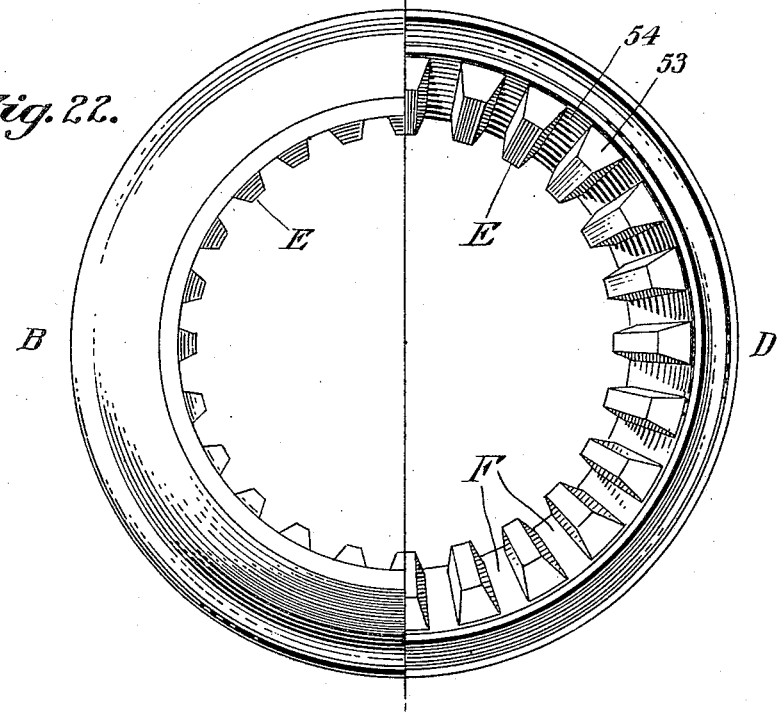
Fig. 22 is a composite view of the fire pot, the left-hand portion showing a bottom plan view thereof and the right-hand portion showing a top plan view thereof.

As stated above, the combustion chamber is supported on the fire pot 13 which is shown in Fig. 2 and illustrated in detail in Figs. 21 and 22. This fire pot is of general frustro-conical shape and tapers inwardly from its top to its bottom. The top is provided with a groove 51 to receive the depending flange 44 of the combustion chamber. The lower end of the combustion chamber is suitably mounted in the grooved flange member 52, as illustrated in Fig. 2 of the drawing. The fire pot is provided on its inner face with a plurality of longitudinally extending ribs or projections 53. These are spaced apart and have bevelled or inclined ends and sides. They are of sufficient depth or thickness to form separate channels 54 therebetween. These channels form a very important part in this construction and that is to receive, conduct and direct the air along the sides of the fire pot and along the sides of the combustion chamber as previously described, the ultimate purpose being to increase the combustion of fuel.

The grate 10 is shown in detail in Figs. 23 to 29 inclusive, and is mounted for rotation as shown in Fig. 2 and as previously described, the rollers 12 fitting in the course or raceway 55 on the bottom of the grate. This grate is of general circular shape having an enlarged rectangular opening 56 in the central part thereof, the body of the grate being sloped or inclined downwardly as at 57 toward this opening so that the grate itself has a sort of upwardly flaring appearance in cross-section. It is provided with a plurality of small openings 58 and notches 59 in its edge to permit the ready circulation of air therethrough and therealong.

On the under side of the grate I provide the guideways 60 for the purpose of receiving the slide dump 61 which is provided with the body or grate portion 62 apertured as shown and having the end extensions 63 to rest in the guideways when the slide dump is in its extended or open position as shown in Fig. 29. On its other end this slide dump is provided with horizontally extending arm 64, which is provided with the slot 65 in which is positioned the lug 66 depending from a portion of the grate proper. Suitable means is provided for the actuation of this slide dump. In order to provide for the oscillating shaking motion of the grate, I provide the actuating lever 67 which is connected by means of a suitable link and lever connection 68 to the arm or member 69 depending from the under side of the grate.

It is to be especially noted that due to the shape of the grate the air passes to a large extent through and around the sides thereof and thence along the sides of the fire box as previously described. This causes the fuel to burn in the sides of the fire pot toward the center, resulting in increased efficiency in consumption thereof.

What I claim is:—

1. A heater of the character described including in combination a casing, a grate, a fire pot, a combustion chamber and a heating drum mounted thereon, said heating drum being provided with upper and lower approximately horizontal flues communicating at one end and adapted to cause the gases and products of combustion to traverse the drum first in one direction and then in the opposite direction, the lower flue having a downwardly directed portion at one end and the upper flue having a downwardly directed portion at the opposite end, the said downwardly directed portions operating to retard the passage of the gases and products of combustion through the drum.

2. A heater of the character described including in combination a casing, a grate, a fire-pot, a combustion chamber, and a heating drum mounted thereon, said heating drum being provided with upper and lower approximately horizontal flues communicating at one end and adapted to cause the gases and products of combustion to traverse the drum first in one direction and then in the opposite direction, said drum being provided with draft retarding means at one end of one flue and at the opposite end of the flue to retard the passage of gases and products of combustion through the drum.

3. A heater of the character described including in combination a casing, a grate, a fire pot, a combustion chamber and heating drum mounted thereon, said heating drum having upper and lower approximately horizontal flues communicating at one end and adapted to cause the gases and products of combustion to traverse the drum first in one direction and then in the other, and having a downwardly directed portion at one end of one flue and at the opposite end of the other flue to retard the passage of the gases and products of combustion through the drum, said drum comprising upper and lower sections arranged one upon the other and mounted upon the combustion chamber, the lower section being provided with a central opening communicating with the combustion chamber.

4. A heater of the character described including in combination a casing, a grate, a fire pot, a combustion chamber and a heating drum mounted thereon, said heating drum having upper and lower approximately horizontal flues communicating at one end and adapted to cause the gases and products of combustion to traverse the drum first in one direction and then in the other, and having a downwardly directed portion at one end of one flue and at the opposite end of the other flue to retard the passage of the gases and products of combustion through the drum, said drum comprising an upper section of convex shape, a partition plate corresponding in shape thereto and forming the bottom of said upper section and having an opening near each end and a lower section having openings near each end in the top communicating with the openings in the partition plate and having an intermediate opening in its bottom to communicate with the combustion chamber, and a damper carried by the lower section and located adjacent the downwardly directed portion of the upper section.

5. In a furnace, in combination with a heater provided with a combustion chamber having a contracted outlet, of a radiator section adapted to cap said combustion chamber and formed with an interior partition providing a surrounding flue for the passage of the products of combustion, a valve normally closing said flue against direct egress of the products of combustion, means to open and close said valve, said flue at diametrically opposite points extending downwardly and normally requiring a triple-turn of the products of combustion from the point of ingress into the radiator section to the point of egress therefrom.

6. In a furnace, in combination with a heater provided with a combustion chamber having a contracted outlet, of a radiator section adapted to cap said combustion chamber and formed with an interior partition providing a surrounding flue for the passage of the products of combustion, a clean out spout leading from said flue in one direction, a spout leading from said flue in another direction for the egress of the products of combustion, a valve arranged in said flue to normally close the flue against direct egress of the products of combustion, means to open and close said valve, said flue being of sinuous formation with superimposed portions and constructed with down draft portions from the point of ingress to the point of egress.

VIRGIL O. JONES.